P. VANDERWAL.
SHIP'S DAVIT.
APPLICATION FILED MAR. 11, 1922.

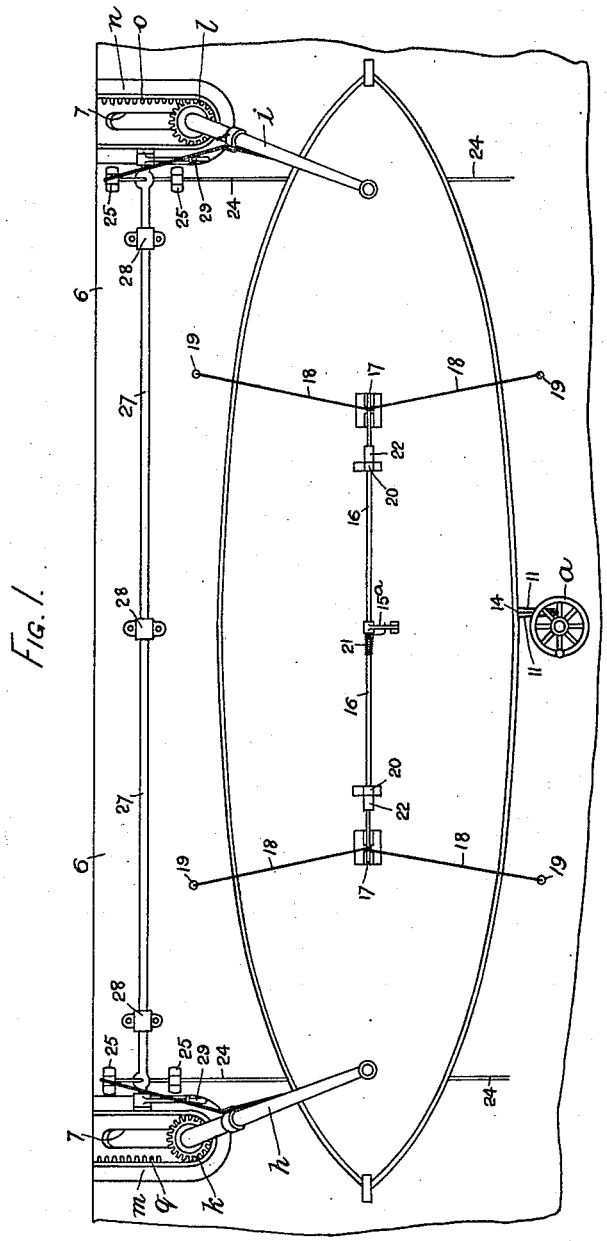

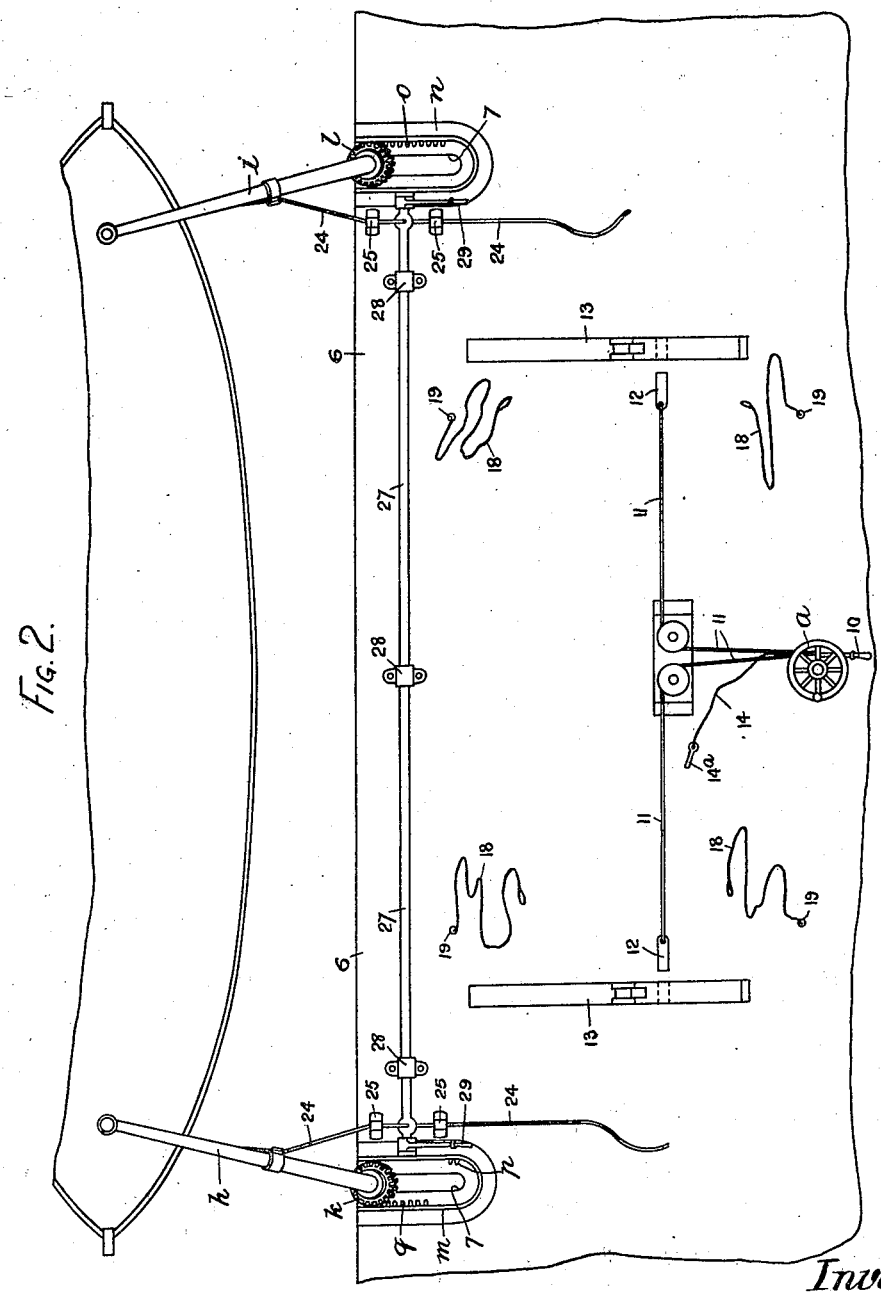

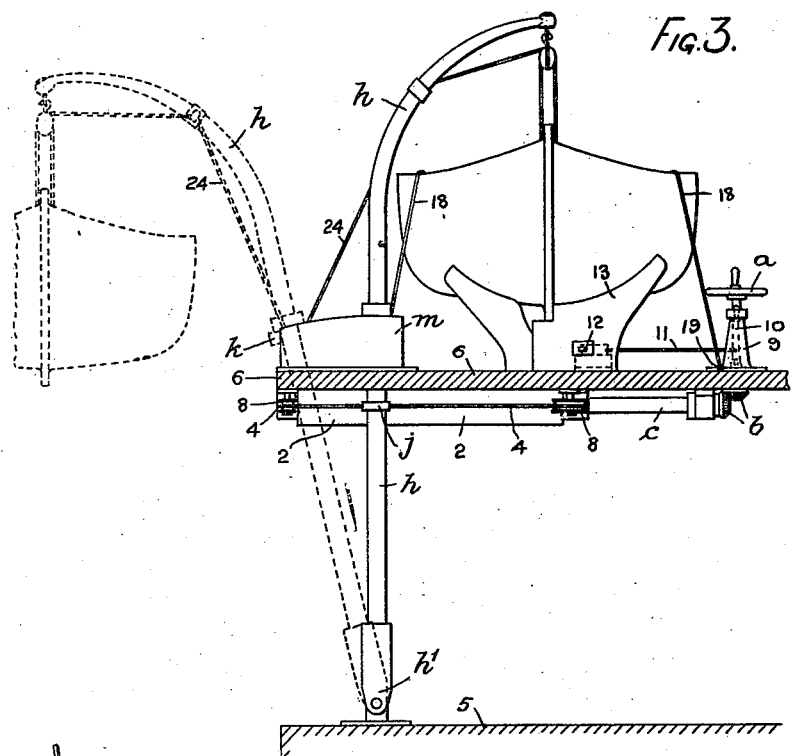
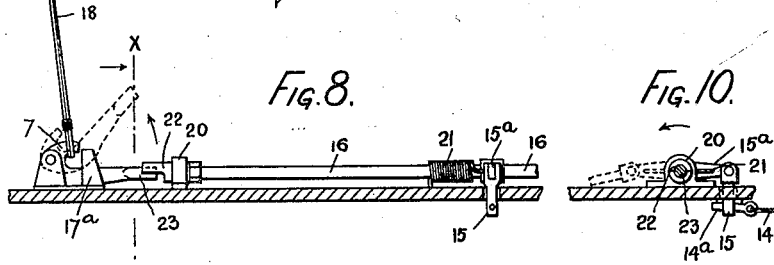
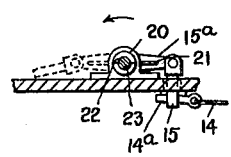
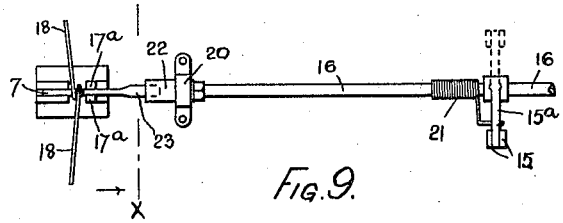

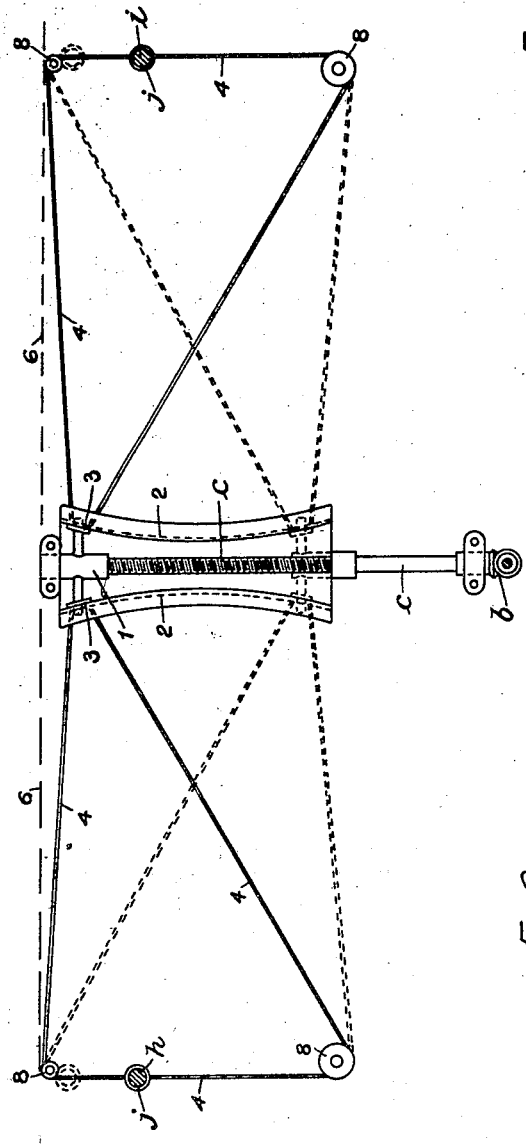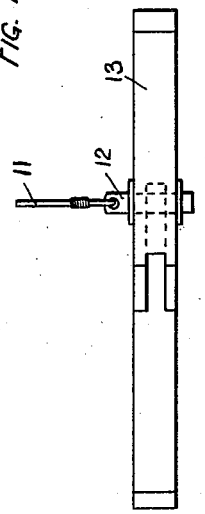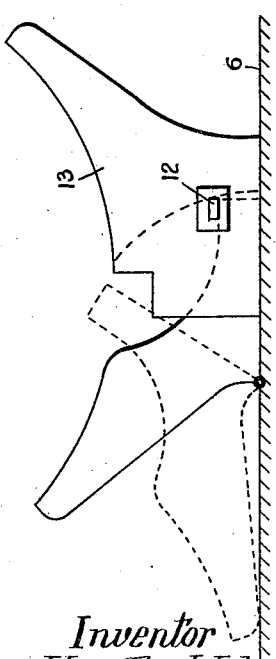

1,430,516.

Patented Sept. 26, 1922.
6 SHEETS—SHEET 5.

Inventor
Pieter Van Der Wal
by Wilkinson & Giusta
Attorneys.

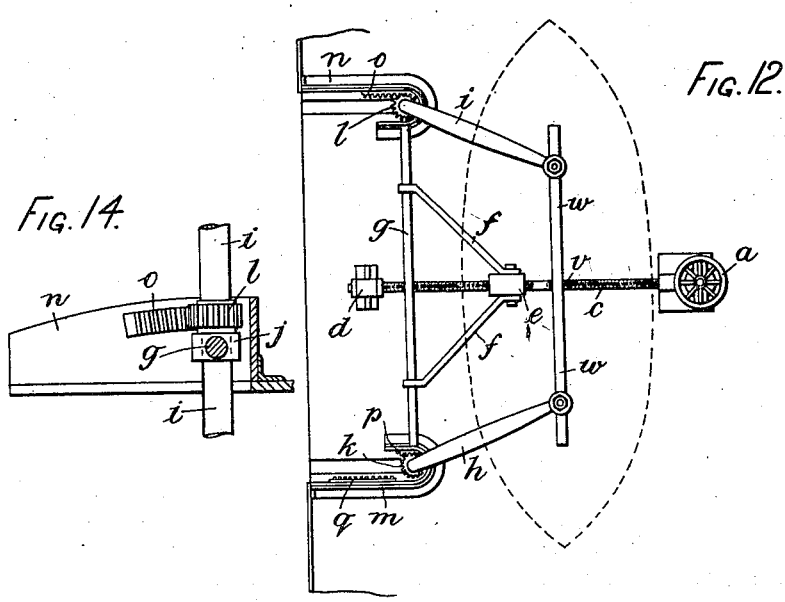
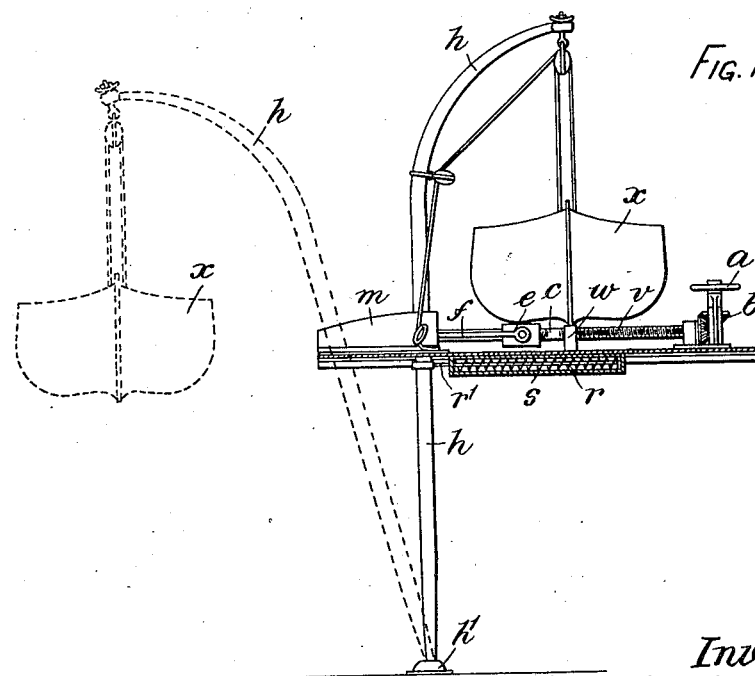

Patented Sept. 26, 1922.

1,430,516

UNITED STATES PATENT OFFICE.

PIETER VANDERWAL, OF BRONDESBURY, LONDON, ENGLAND.

SHIP'S DAVIT.

Application filed March 11, 1922. Serial No. 543,011.

*To all whom it may concern:*

Be it known that PIETER VANDERWAL, nautical adviser, a subject of the Queen of the Netherlands, residing at Waldeck House, 135 Willesden Lane, Brondesbury, in the county of London, England, has invented a certain new and useful Improvement in or Relating to Ships' Davits, of which the following is a specification.

This invention has for its object to provide improved means for operating ships' davits.

According to the present improvements the two davits are coupled together by connections which are operated by a screwed shaft or equivalent gear for the purpose of moving the davits simultaneously from an inboard position to an angular outboard position and vice versa, means being provided for positively rotating both davits except during small portions of such movement.

As an example, the pair of davits may be operated by a pair of endless wire ropes, each arranged in the form of a triangle, the said ropes being attached to the davits along the bases of the triangles and having the apices of the triangles located midway between the davits where the ropes are connected to runners sliding in curved guides, each forming a segment of an ellipse, said curved guides being placed back to back so as to be traversed by a common crosshead carrying the runners, and operated by a screwed shaft, the runners having movement transversely of the crosshead so that they may follow the curved formation of the guides.

The davits are rotated during their in and out movement by racks and pinions.

The operating wheel or handle by which the screwed shaft and crosshead are operated is provided with a locking and releasing lever, the movement of which to the releasing position also serves through suitable connections to release the boat supports and retaining devices so that as soon as the said davit operating handle is ready for operation the boat is free to be launched by the davits. Means may also be provided in the form of a brake mechanism for clamping or freeing the fall ropes for launching or raising the boat.

The accompanying drawings show, Figs. 1 to 11, one construction and arrangement of ships' davits and gear made in accordance with this invention.

Figs. 12, 13, and 14 show a modified construction.

Fig. 1 is a plan showing the davits with the boat in the inboard position.

Fig. 2 is a plan showing the davits with the boat in the outboard position ready for lowering.

Fig. 3 is an end elevation.

Fig. 4 is a plan of the davit operating mechanism with the boat deck removed.

Figs. 6 and 7 are respectively side view and plan of the boat stand.

Figs. 8 and 9 are respectively side elevation, and plan of the boat claws and releasing mechanism therefor.

Fig. 10 is a part sectional end elevation on line X—X of Figs. 8 and 9.

Fig. 12 is a plan,

Figure 5:
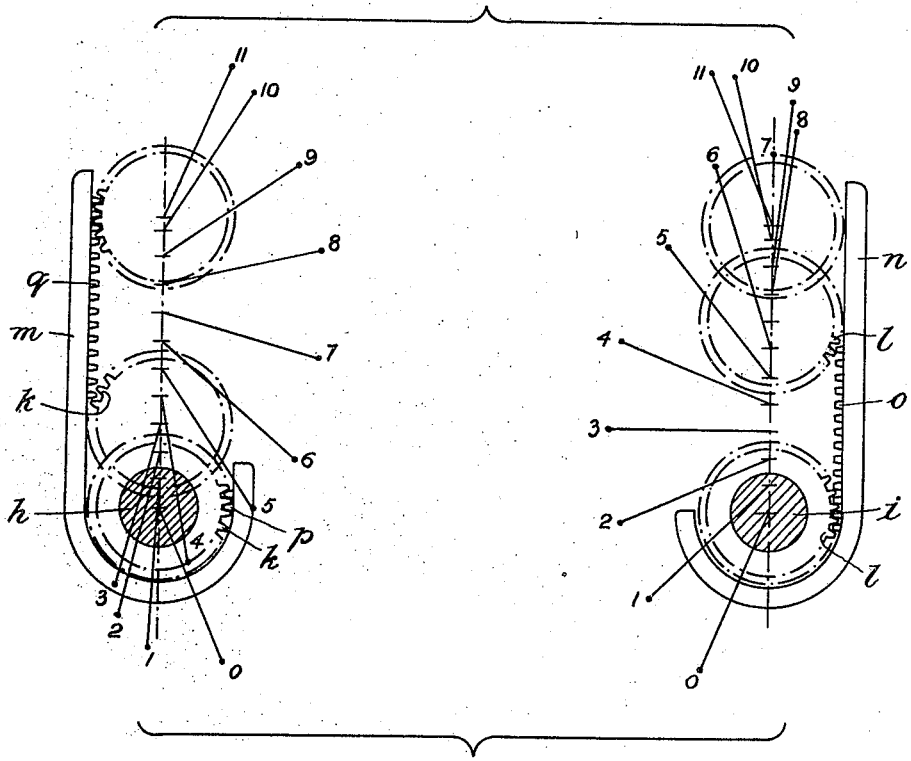
Fig. 5 is a diagrammatic view of the davits and operating racks in several positions during the movement from the inboard to the outboard lowering position.
Figure 11:
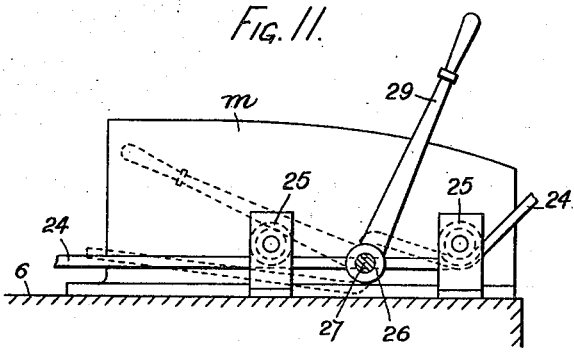
Fig. 11 is a side elevation of the brake mechanism for the fall ropes.

Fig. 13 a part sectional elevation, and

Fig. 14 a part sectional elevation showing a modified construction.

Referring to Figs 1 to 11 of the drawings and particularly to Figs. 1, 2, and 3, $a$ is a handwheel which, through bevelled gear $b$ is adapted to rotate a screwed shaft $c$ located beneath the boat deck, the outer end of which screwed shaft is provided with a crosshead 1, adapted to be traversed by the screw along curved guides 2, 2 which are formed as segments of an ellipse and are placed back to back so as to lie on either side of the said screwed shaft $c$ and so that runners 3, 3 carried upon the crosshead and having lateral movement thereon may follow the curved guides when traversed thereon with the crosshead 1. The runners 3, 3, are each connected by wire ropes 4, 4 to collars $j$ through which the respective davits $h$ and $i$ pass.

It will be seen that the wire ropes 4, 4 are arranged in the form of endless ropes of triangular formation in plan the attachment to the collars $j$ being along the bases of the triangles whilst the apices are connected to the runners 3, 3 upon the curved guides 2, the arrangement being such that a movement of the runners 3, 3 from one end of the curved guides to the other moves the davits from the inboard position to the required angular outboard position or vice versa, as indicated by the dotted lines in Fig. 4. By mounting and travelling the runners 3, 3 in the guides 2 curved as described, the ropes are kept taut throughout the operation, and any slackness in that portion of the rope which is following the movement of the davit is prevented so that the weight of the boat and the mechanism is always under control. Guide pulleys 8 are provided in suitable position for the wire ropes 4.

The said davits $h$ and $i$ are provided with universal joints $h'$ at their lower ends where they are seated on the deck 5 below the boat deck 6, in which latter slotted guides 7 are provided to permit of the inward and outward angular movement of the davits. Just above or about the slotted guides 7 in the boat deck 6 the davits have fixed thereon toothed pinions $k$ and $l$. These pinions $k$ and $l$ have a suitable number of teeth say 32 and are adapted to engage with racks mounted on frames or casings $m$ and $n$ respectively, the frame $n$ is provided with a rack $o$ having 14 teeth, and the casing $n$ is provided with two racks $p$ and $q$ disposed on opposite sides of the path travelled by the pinion $k$ on the davit $h$, the rack $p$ has 2 teeth and the rack $q$ 15 teeth. The number of teeth may of course be varied with the pitch.

In order that the boat may be properly and automatically released from its supports at the commencement of the launching operation, the operating hand-wheel $a$ has fitted adjacent thereto or upon the same standard 9 a hand-lever 10, connected by ropes or wires 11 to the releasing bolts 12 of the hinged boat stands 13, the releasing lever 10 being also connected by a wire or rope 14, to a locking pin 14$^a$ engaging with the rod 15 pivoted to the end of a lever 15$^a$ which is attached to a shaft 16 carrying or operating the boat releasing claws 17 which are located within the boat and by which the boat is secured to the deck by ropes 18 passing out over the side of the boat and fastened to eyes 19 on the boat deck 6.

The rod 15 upon the end of the releasing lever 15$^a$ passes out through the usual plug hole in the boat as will be seen from Figs. 8 and 10.

The shaft 16 which holds or releases the pivoted boat claws 17 is mounted in suitable bearings 20 and is adapted to be partly rotated by a spring 21, the ends of the said shaft being cut away underneath or otherwise formed with locking projections 22 of semi-circular section, which in the locked position are located above the ends 23 of the pivoted claws 17, the locked ends of which move into and out of guard plates 17$^a$ which prevent the rope eyes attached to the retaining ropes 18 from becoming free until the claws 17 are released by the lever 16, as indicated in dotted lines Fig. 8.

In order that the lowering of the boat when in launching position may be effected safely and under proper control the fall ropes 24 are passed through a pair of guide rollers 25, 25 on the boat deck 6, and also through transverse holes 26 in enlargements upon the ends of a shaft 27, which is located between each pair of guide rollers 25, 25. The said shaft 27 extends from one davit to the other and is mounted in suitable bearings 28 and also fitted at each end with an operating lever handle 29, the arrangement being such that when the lever handle 29 is laid or held in a substantially horizontal position on one side of the shaft the holes 26 in the shaft 27 are moved transversely of the fall rope so as to grip and prevent movement thereof whilst the placing of the lever handle 29 in a forward position will bring the holes 26 more or less in alignment with the ropes and permit the same to pass more or less freely therethrough and over the guide rollers 25. The holes 26 in the shaft 27 and the lever handle 29 therefor form a brake by which the fall ropes 24 are controlled and by which the release of the ropes in lowering the boat is controlled in a very convenient and effective manner.

In operation, when it is desired to launch the boat it is only necessary to pull upon the lever 10 which through the connecting wires 11 pulls out the locking pins 12 of the boat supports and at the same time pulls out the locking pin 14$^a$ which holds the boat claw mechanism, the shaft 16 in the bottom of the boat being thus released rotates under the action of its spring 21, and the locking projections 22 move away from over the ends of the boat claws 17 and the latter being now free turn upon their pivoted ends to the position shown dotted in Fig. 8, thereby releasing the boat retaining lines 18, the boat is then free to be launched by the davits for which purpose it is only necessary to turn the hand-wheel $a$, to the right when the screwed shaft $c$ will traverse the crosshead 1 and the runners 3 backward in the curved guides 2 and through the ropes 4 and collars $j$ will pull the davits $h$ and $i$ outwards in their slotted guides 7, the endless formation of the rope connections 4, and the provision of the curved guides 2 ensuring that the following portion of the ropes 4 will always follow the movement of the davits without any undue slackness so that the weight will always be in hand, and the ropes ready for the inboard movement when required.

The angular movement of the davits to the inclined outboard position will effect the required part rotary movement thereof through the medium of the coacting pinions $k$ and $l$ and racks $o$ $p$ $q$ until the davits assume an angular outboard position as indicated by dotted lines in Fig. 3.

The several movements which take place in the operations of the davits will be clearly followed by reference to the diagrammatic view, Fig. 5, which shows the davits in several positions marked 0 to 11 in passing from the inboard to the outboard position.

At the initial portion of the movement the pinion $l$ gears with the rack $o$ causing the davit to swing outboard to the position 3, during this movement the pinion $k$ on davit $h$ will have been engaged by the teeth of the rack $p$ and the davit $h$ moved to the position 3 to accommodate itself to the movement of davit $i$.

Continued operation of the hand-wheel $a$ brings the pinion $k$ out of engagement with the rack $p$ for a short period and then brings the said pinion $k$ into engagement with the rack $q$ and now by the operation of both pinions $k$ and $l$ and the coacting racks $o$ and $q$, the davits $h$ and $i$ move out to the positions 7, 7 the boat end slung from the davit $i$ being now in the outer position, the pinion $l$ on davit $i$ is moved out of engagement with rack $o$ thus leaving the davit $i$ free to accommodate itself to the movement of the davit $h$.

The davit $h$ continues to be operated by the engagement of the pinion $k$ with rack $q$ and as the davit $i$ is free to rotate backwards this last movement imparted by the rack $q$ brings both davits $h$ and $i$ with the boat to the launching position 11—11.

The several movements are reversed in swinging the boats inwards, it being only necessary when the boat has been raised to the required level by the falls to turn the hand wheel $a$ to the left and thus swing in the boat and return the davits to their original inboard position when the boat supporting and holding devices are assembled to make the boat secure, ready for the next launching operation.

In the modified construction shown in Figs. 12–13 and 14, the davits $h$ and $h'$ are connected together by a bar $g$ which is operated from the handwheel $a$ through the medium of bevel gearing $b$, screwed shaft $c$, nut $e$ and frame $f$, in which latter the connecting bar $g$ is mounted.

The screwed shaft $g$ is provided at its end nearest the handwheel with a reversed screw $v$ passing through a nut in a beam $w$ which supports the boat $x$ when stowed on deck. Any suitable boat supporting clips or chocks may be employed which are adapted to be released and if required replaced by the movement of the beam $w$ or an aquivalent member operated by the screwed shaft $c$.

$r$ is a strong spring adapted for example to withstand a load of two tons, this spring is suitably mounted in a casing below the deck and connected by a rod $r'$ to the davits so as to restrain the outward angular movement and assist the inward movement thereof.

In operation, for launching the boat the hand wheel $a$ is turned to the right when the screwed shaft $c$ will move the beam $w$ inwards and thus free the boat and swing her out by the continued movement of the said hand-wheel $a$ which causes the screwed shaft $c$ through the connecting bar $g$ to push the davits $h$ and $i$ outwards and effect the required part rotary movements thereof through the medium of the coacting pinions $k$, $l$ and racks $o$, $p$ and $q$ until the davits assume an angular outboard position as indicated by dotted lines in Fig. 13. The spring $r$ serves to prevent the boat from being swung out too quickly and the same springs will greatly assist the work in returning the davits to upright position when swinging the boats in again.

The several movements which take place in performing the operations will be otherwise as described with reference to the construction shown in Figs. 1 to 11.

What I claim as my invention and desire to secure by Letters Patent is:—

1. In ships' davits capable of movement to and from an angular outboard position, means for coupling the davits together, means for operating said coupling whereby the davits are simultaneously reciprocated to and from an angular outboard position, means for positively rotating both the said davits during their said angular movements except for portions of said movement.

2. In ships' davits capable of movements to and from an angular outboard position, flexible members coupling the davits together, means for operating said flexible members whereby the davits are simultaneously reciprocated to and from an angular outboard position, means for positively rotating both the said davits during their said angular movements except for portions of said movement.

3. In ships' davits capable of movement to and from an angular outboard position, flexible members coupling the davits together, means for operating said flexible members whereby the davits are simultaneously reciprocated to and from an angular outboard position, pinions on said davits, fixed fragmentary racks coacting with said pinions to positively rotate said davits during their angular movements except for portions of said movement.

4. In ships' davits capable of movement to and from an angular outboard position, flexible members coupling the davits together, means for operating said flexible members whereby the davits are simultaneously reciprocated to and from an angular outboard position, pinions on said davits, slotted guides for said davits in the boat deck, a universal pivotal joint for the davits on the deck below the boat deck, pinions on said davits, fragmentary racks mounted alongside said slotted guides and coacting with said pinions to positively rotate the davits during their angular movements except for portions of said movement.

5. In ships' davits capable of movement to and from an angular outboard position, means for coupling the davits together consisting of wire ropes arranged in triangular formation said ropes being connected to the davits along the bases of the triangles whilst the apices are attached to runners sliding in guides curved to the segment of an ellipse, a screwed shaft with cross head for traversing said runners, and a hand wheel for operating said screwed shaft, pinions on said davits fixed fragmentary racks coacting with said pinions to positively rotate said davits during their angular movements except for portions of said movements.

6. In ships' davits capable of movement to and from an angular outboard position, means for coupling the davits together, a handle with screwed shaft and gear for operating said coupling member whereby the davits are simultaneously reciprocated to and from an angular outboard position, means for positively rotating both the said davits during the said angular movements except for portions of said movement, and means associated with said handle which operates the coupling member for releasing the boat supports and boat retaining devices.

7. In ships' davits capable of movement to and from an angular outboard position, means for coupling the davits together, a handle with screwed shaft and gear for operating said coupling member whereby the davits are simultaneously reciprocated to and from an angular outboard position, means for positively rotating both the said davits during the said angular movements except for portions of said movement, a lever handle associated with the handle which operates the coupling member, and flexible connections coupling said lever handle to the releasing pins of the boat supports and boat retaining devices whereby the said devices may be released by the operation of said lever handle prior to the operation of the handle for operating the davits.

8. In ships' davits capable of movement to and from an angular outboard position, means for coupling the davits together, a handle with screwed shaft and gear for operating said coupling member whereby the davits are simultaneously reciprocated to and from an angular outboard position, means for positively rotating both the said davits during the said angular movements except for portions of said movement, a lever handle associated with the handle which operates the coupling member, folding stools for supporting the boat and locking pins for said stools, releasable claws arranged within the boat for receiving retaining ropes which pass out over the side of the boat to eyes on the deck, a spring rotated shaft arranged within the boat and engaging said claws, flexible connections coupling said lever handle to the locking bolts for said stools and to said spring rotated shaft which engages said boat releasing claws, and whereby the operation of said lever handle releases said locking bolts and said boat retaining claws.

9. In ships' davits capable of movement to and from an angular outboard position, means for coupling the davits together a handle with screwed shaft and gear for operating said coupling member whereby the davits are simultaneously reciprocated to and from an angular outboard position, means for positively rotating both the said davits during the said angular movements except for portions of said movement, means associated with said handle which operates the coupling member for releasing the boat supports and boat retaining devices, means for controlling the fall ropes during launching consisting of a part rotary shaft provided with lever handles, and having transverse holes through which the fall ropes are passed, and whereby the angular position of the shaft under the control of the lever handle brakes or releases the fall ropes during launching of the boat.

10. In ships' davits capable of movement from an inboard position to an angular outboard position, means for coupling the davits together consisting of wire ropes arranged in triangular formation, said ropes being connected to the davits along the bases of the triangles whilst the apices are attached to runners sliding in guides curved to the segment of an ellipse, means for traversing said runners in their guides for the purpose of moving the davits to and from the outboard position, and means for positively rotating both the said davits during their angular movements except for portions of said movement.

P. VANDERWAL.